(12) United States Patent
Verburg et al.

(10) Patent No.: US 11,237,890 B2
(45) Date of Patent: Feb. 1, 2022

(54) ANALYTICS INITIATED PREDICTIVE FAILURE AND SMART LOG

(71) Applicant: INTERNATIONAL BUSINESS MACHINES CORPORATION, Armonk, NY (US)

(72) Inventors: David Verburg, Mantorville, MN (US); Timothy O'Callaghan, Rochester, MN (US); M. Dean Sciacca, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 16/546,836

(22) Filed: Aug. 21, 2019

(65) Prior Publication Data
US 2021/0055978 A1 Feb. 25, 2021

(51) Int. Cl.
*G06F 11/00* (2006.01)
*G06N 20/00* (2019.01)
*G06F 11/30* (2006.01)
*G06F 11/32* (2006.01)

(52) U.S. Cl.
CPC ........ *G06F 11/008* (2013.01); *G06F 11/3058* (2013.01); *G06F 11/327* (2013.01); *G06N 20/00* (2019.01)

(58) Field of Classification Search
CPC ............... G06F 11/3409; G06F 11/079; G06F 11/0793; G06F 11/0751; G06F 11/008; G06F 11/0709; G06F 11/3055; G06F 11/3006; G06F 11/3466; G06F 2201/86; G06F 2201/81; G06F 2201/815; G06F 11/30; G06F 11/3024; G06F 11/3058;
(Continued)

(56) References Cited

U.S. PATENT DOCUMENTS 5,761,093 A 6/1998 Urbish et al.
5,822,218 A 10/1998 Moosa et al.
(Continued)

FOREIGN PATENT DOCUMENTS

JP H1034122 A 2/1998
WO 2017184157 A1 10/2017

OTHER PUBLICATIONS

Blackblaze.com, [online]; [retrieved on Aug. 13, 2019]; retrieved from the Internethttps://www.backblaze.com/blog/what-smart-stats-indicate-hard-drive-failures/ ,3p.
(Continued)

*Primary Examiner* — Amine Riad
(74) *Attorney, Agent, or Firm* — Cantor Colburn LLP; Tihon Poltavets

(57) ABSTRACT

An aspect includes receiving a drive log page including data from a plurality of disk devices, in which the drive log page includes a plurality of attribute fields including a reassignment field that tracks data movement from a failing sector of a disk device to a new sector of the disk device. Performing, by the system, a failure prediction based on attribute data of the drive log page to identify one or more disk devices of the plurality of disk devices that are predicted to fail. Disabling, by the system, the one or more disk devices in response to the failure prediction.

20 Claims, 9 Drawing Sheets

(58) Field of Classification Search
CPC .............. G06F 11/3495; G06F 11/004; G06F 11/0721; G06F 11/0757; G06F 11/3072
See application file for complete search history.

(56) References Cited

U.S. PATENT DOCUMENTS

| | | | |
|---|---|---|---|
| 6,223,252 B1* | 4/2001 | Bandera | G06F 11/2069 711/112 |
| 6,401,214 B1* | 6/2002 | Li | G06F 11/004 711/112 |
| 6,493,656 B1* | 12/2002 | Houston | G06F 11/0727 702/187 |
| 6,832,205 B1 | 12/2004 | Aragones et al. | |
| 6,886,108 B2* | 4/2005 | Talagala | G06F 11/004 714/47.2 |
| 6,982,842 B2* | 1/2006 | Jing | G11B 19/04 324/212 |
| 7,539,907 B1 | 5/2009 | Johnsen et al. | |
| 7,676,445 B2 | 3/2010 | Fry et al. | |
| 7,730,364 B2 | 6/2010 | Chang et al. | |
| 7,908,526 B2 | 3/2011 | Guha | |
| 8,566,637 B1* | 10/2013 | Puhov | G06F 11/0727 714/6.32 |
| 8,713,356 B1* | 4/2014 | Chan | G06F 11/0793 714/6.1 |
| 8,782,465 B1* | 7/2014 | Foley | G06F 11/008 714/6.22 |
| 8,843,781 B1* | 9/2014 | Chiang | G06F 11/0745 714/6.11 |
| 9,229,796 B1 | 1/2016 | Ma et al. | |
| 9,239,746 B2 | 1/2016 | Fahim et al. | |
| 9,389,939 B2* | 7/2016 | Miyamoto | G06F 11/0793 |
| 2004/0103337 A1* | 5/2004 | Smith | G06F 11/008 714/2 |
| 2005/0044451 A1 | 2/2005 | Fry et al. | |
| 2005/0060618 A1 | 3/2005 | Guha | |
| 2005/0216800 A1* | 9/2005 | Bicknell | G06F 11/008 714/718 |
| 2007/0079170 A1 | 4/2007 | Zimmer et al. | |
| 2014/0317347 A1* | 10/2014 | Aida | G11B 20/1889 711/114 |
| 2014/0359376 A1 | 12/2014 | Fahimi et al. | |
| 2015/0046756 A1* | 2/2015 | Sreekumaran | G06F 11/008 714/47.2 |
| 2015/0205657 A1 | 7/2015 | Clark | |
| 2017/0212799 A1* | 7/2017 | Konireddygari | G06F 11/0781 |
| 2018/0150354 A1* | 5/2018 | Lee | G06F 11/1092 |
| 2021/0109662 A1* | 4/2021 | Mendonsa | G06F 3/0659 |

OTHER PUBLICATIONS

Chattopadhyay, et al., "Machine Learning and Failure Prediction In hard Disk Drives" HePiX, Oct. 2015 22p.
El-Shimi., "Predicting Storage Failures," Vault-Linux Storage and File Systems Conference, 2017, 35p.
Gaber et al., "The Data Science of Predicting Disk Drive Failures" Direct2DellEMC, 2016, 7p.
IBM, "IBM Smarter Analytics—Predictive Analytics for Server Incident Reduction (PASIR)" 2014, 5p.
Mell et al., "The Nist Definition of Cloud Computing" National Institute of Standards and Technology, Sep. 2011, 7p.
Murray et al., "Machine Learning Methods for Predicting Failures in HardDrives: A Multiple-Instance Application" Journal of Machine Learning Research, 2005, 34p.

* cited by examiner

| Code | | HDD/SSD | Attribute Name | PFA Trip Point (Snapshot defect count) | Normalized Formula | Raw Data Definition |
|---|---|---|---|---|---|---|
| Dec | Hex | | | | | |
| 1 | 0001h | BOTH | Raw Read Error rate | ≤ | 10log10(Bits Read / (Read Errors + 1)) | Bytes 6-9: read errors corrected w/ possible delay, hard read errors; Bytes 10-15: Total bytes read |
| 2 | 0002h | BOTH | Firmware Image check | Any non-correctable | -- | Bytes 6-9: number times corrected |
| 5 | 0005h* | BOTH | Retired block count | ≤ | 100 – (100* Retired Block Count / Spare Retired Blocks at mfg.) | Bytes 6-9: Grown defect count (retired blocks) |
| 9 | 0009h | BOTH | Power On Hours | -- | -- | Bytes 6-9: power on hours; Bytes 10-15: Time since last power cycle(ms) |
| 12 | 000Ch | BOTH | Power Cycle Count | -- | 100 – (PCC/1024) | Bytes 6-9: power cycle |
| 13 | 000Dh | BOTH | Correctable ECC rate | ≤ | 10log10(Bits Read / SoftReadErrors +1) | Bytes 6-9: read errors recovered w/o delay; Bytes 10-15: Total bytes read |
| 31 | 001Fh | BOTH | Host Lifetime Read OPS | -- | -- | Bytes 6-13: Lifetime read ops from host |
| 33 | 0021h | BOTH | Host Lifetime Write OPS | -- | -- | Bytes 6-7: 100 * (total NAND write data flash host write data) |
| 34 | 0022h | SSD | Write Amplification x 100 | -- | -- | Bytes 6-13: Total MB of data erased |
| 100 | 64h | SSD | Nablyte_Erased | -- | -- | Bytes 6-13: Lifetime read ops from flash |
| 161 | A1h | SSD | Lifetime Flash Read Ops | -- | -- | Bytes 6-13: Lifetime write ops from flash |
| 162 | A2h | SSD | Lifetime Flash Write Ops | -- | -- | |
| 170 | AAh | BOTH | Unused spare block count reported as % remaining | ≤ | 100 * (Current spare blocks / total spare at mfg.) | Bytes 6-9: current number of spare blocks; Bytes 10-13: total spare blocks at mfg. |
| 171 | ABh* | SSD | Program Fail Count | ≤ | -- | Bytes 6-9: Lifetime Program Fails; Bytes 10-13: Program Fails since power on |
| 172 | ACh* | SSD | Erase_Fail_Count | ≤ | -- | Bytes 6-9: Lifetime Erase Fails; Bytes 10-13: Erase Fails since power on |
| 177 | B1h | SSD | Percent Drive Life Remaining | ≤ | 100 – (SSD_life_used) min=0 | Bytes 6-9: Max P/E cycle count; Bytes 10-13: Min P/E Cycle count |

*FIG. 2A*

| Code | | HDD/ SSD | Attribute Name | PFA Trip Point Scrapper default values | Normalized Formula | Raw Data Definition |
|---|---|---|---|---|---|---|
| Dec | Hex | | | | | |
| 184** | B8h** | BOTH | Reported Flash IO Errors Detected (IOEDC) | 5 | --- | Bytes 6-9: Lifetime IOEDC errors |
| 187** | BBh** | BOTH | Reported Uncorrectable Errors | 5 | --- | Bytes 6-9: Lifetime uncorrectable errors |
| 190 | BEh | BOTH | Drive temperature warning since power on | 5 | --- | Byte 6: Current Temp<br>Byte 7: Lowest Temp since power on<br>Byte 8: Max Temp since power on<br>Byte 9: Avg Temp over last week |
| 194 | C2h | BOTH | Device Temperature Lifetime | 5 | --- | Byte 6: Lowest Lifetime Temp<br>Byte 7: Max Lifetime Temp |
| 195** | C3h** | BOTH | Internal RAID Uncorrectable error count | 5 | --- | Byte 6-9: Total number of errors recovered by internal RAID |
| 196** | C4h** | BOTH | Device Reallocation Count | 5 | --- | Bytes 6-9: Grown defect count (retired block) |
| 198** | C6h** | HDD | Offline scan uncorrectable sector count | 5 | --- | Byte 6-9: Uncorrectable errors this power cycle |
| 199** | C7h** | BOTH | SAS R-Errors (CRC) Error Count | --- | --- | Byte 6-9: Current SAS Tx/Rx Error count Part 1<br>Byte 10-13: Current SAS Tx/Rx Error count Port 2<br>Tx/Rx Errors = sum of errors in log page 18 |
| 230 | E6h | SSD | Drive Life Protection Status | 5 | 100 = endurance throttling off<br>0 = endurance throttling on | None |
| 231** | E7h** | SSD | SSD_life_used | 98 | 100 * (Average PECycle) / Max PECycle) | Byte 6-9: Average PE Cycle per NAND block<br>Bytes 10-13 Max PE Cycles per NAND block |
| 232 | E8h | SSD | Available Reserve Flash Memory Space in MiB | 5 | --- | Byte 6-9: Reserve block * Bytes per track) / (1024*2) |
| 233 | E9h | SSD | Lifetime writes to FLASH (MiB) | --- | --- | Byte 6-13: Lifetime flash writes (in MiB) |
| 234 | EAh | SSD | Lifetime reads from FLASH (MiB) | --- | --- | Byte 6-13: Lifetime flash reads (in MiB) |

FIG. 2B

| Code | | HDD/ SSD | Attribute Name | PFA Trip Point Supplier defined -= none | Normalized Formula | Raw Data Definition |
|---|---|---|---|---|---|---|
| Dec | Hex | | | | | |
| 241 | F1h | BOTH | Lifetime Writes from Host (MiB) | -- | -- | Byte 6-13: Lifetime host writes (in MiB) |
| 242 | F2h | BOTH | Lifetime Reads to Host (MiB) | -- | -- | Byte 6-13: Lifetime host reads (in MiB) |
| 243 | F3h | SSD | Volatile Memory Backup Failure (pre-fail) | 50 | 100 = Pass, 0 = Fail. Fail when capacity cannot guarantee safe shutdown under worst case. Any Fail must be persistent | Bytes 6-9: Value that represents backup capacity charge health at pwr-up time Bytes 10-13 Value that represents backup capacity charge currently |
| 244 | F4h | SSD | Security Wear Indicator (pre-fail) | 50 | 100 = Pass, 0= Fail (0-100) | -- |
| 245 | F5h | HDD | Drive idling percentage | -- | % idle for last 7 days | -- |
| 246 | F6h | HDD | Reassigns including pending reassigns | -- | -- | Byte 6: head w most reassigns Bytes 7-10: number of reassigns for head in byte 6 Bytes 11-14: # pending reassigns for head in byte 6 |
| 247 | F7h | HDD | Helium Monitor | 5 | 5 | Bytes 6-9: Helium Reading at Mfg Bytes 10-13 Helium Reading Current |
| 248 | F8h | HDD | RV Monitor | 5 | 5 | Bytes 6-9: Maximum Bytes 10-13 Current |
| 249 | F9h | BOTH | Last Key Code Qualifier | -- | -- | Byte 6-9: Key-Code-Qualifier Byte 10-11: LBC if applicable Byte 12:13: POH of error |
| | 8000-8FFF | | VENDOR A UNIQUE RANGE | | | |
| | 9000-9FFF | | VENDOR B UNIQUE RANGE | | | |
| | A000-AFFF | | VENDOR C UNIQUE RANGE | | | |
| | B000-BFFF | | VENDOR D UNIQUE RANGE | | | |
| | C000-CFFF | | VENDOR E UNIQUE RANGE | | | |

*FIG. 2C*

ANALYTICS INITIATED PREDICTIVE FAILURE AND SMART LOG

BACKGROUND

The present invention generally relates to predicting disk device failures and more specifically, to prediction of disk device failures based on analytics initiated predictive failure (AIPFA) analysis and attributes of a drive log page such as, for example, attributes of a self-monitoring, analysis, and reporting technology (SMART) log.

The phrase "machine learning" broadly describes a function of an electronic system that learns from data. A machine learning system, engine, or module can include a trainable machine learning algorithm that can be trained, such as in an external cloud environment, to learn functional relationships between inputs and outputs, wherein the functional relationships are currently unknown.

SMART broadly refers to a function of an interface between a disk drive and a drive controller, in which the drive controller receives information from disk drives, through the SMART interface, in the form of attributes.

SUMMARY

Embodiments of the present invention provide a computer-implemented method for disk device failure prediction based on AIPFA analysis and attributes of a drive log page such as, for example, attributes of a SMART log. A non-limiting example computer-implemented method includes receiving, by a system comprising one or more processors, a drive log page including data from a plurality of disk devices, in which the drive log page includes a plurality of attribute fields including a reassignment field that tracks data movement from a failing sector of a disk device to a new sector of the disk device. The method includes performing, by the system, a failure prediction based on attribute data of the drive log page to identify one or more disk devices of the plurality of disk devices that are predicted to fail. The method includes disabling, by the system, the one or more disk devices in response to the failure prediction.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 2A-2C in combination depict an example SMART log in accordance with one or more embodiments of the present invention;

Figure 1:
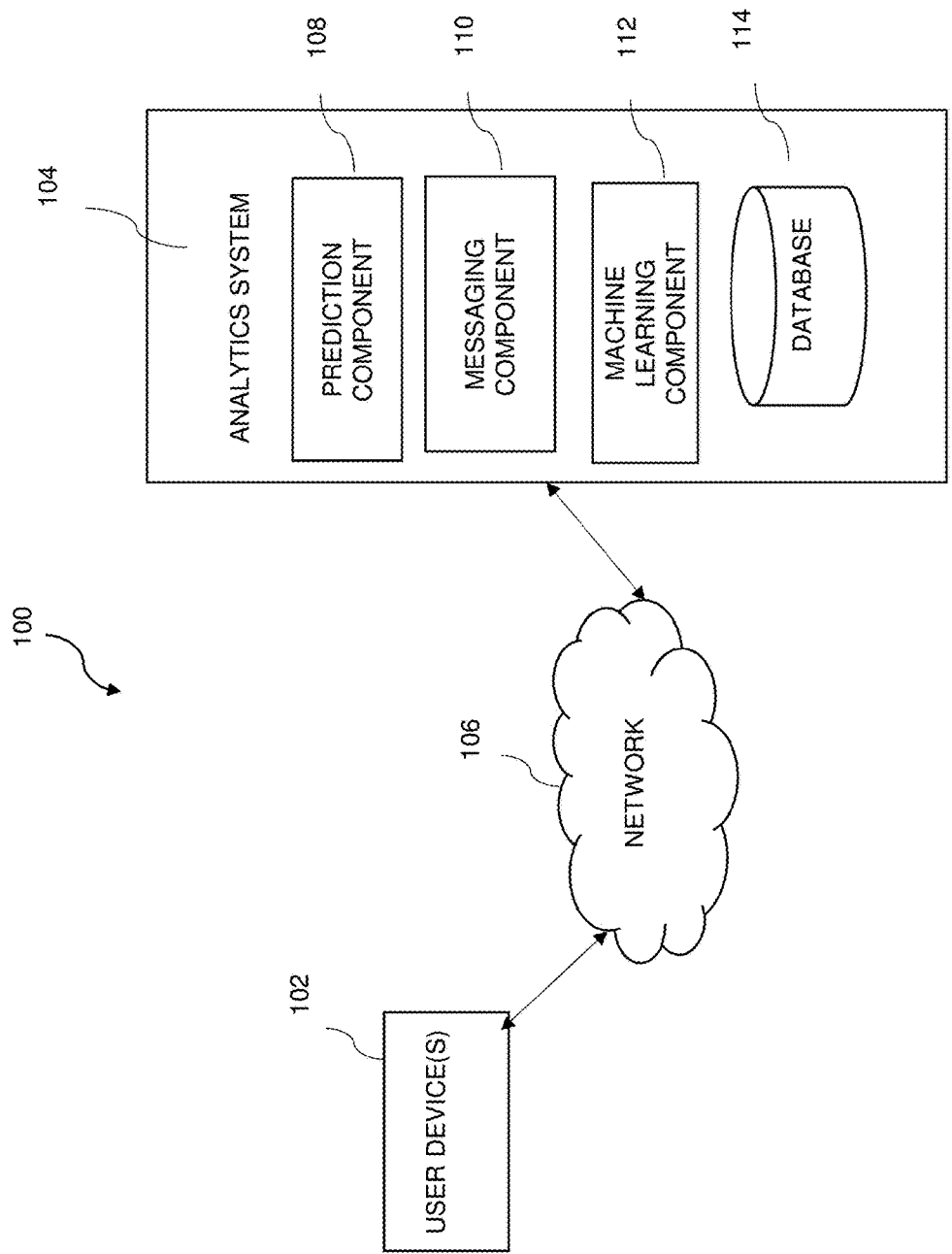
FIG. 1 depict a block diagram of an example distributed environment in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a drive analysis system that collects key data needed for predictive analysis in a stream-lined way, in which key fields are chosen for addition to an improved drive log page such as, for example, a self-monitoring, analysis, and reporting technology (SMART) log page based on new data needed to predict current failures in the field. An example of a new field that has been added is the "Reassigns including Pending Reassigns" field (i.e., reassignment field), which is key data that may be utilized to, among other things, predict failures for the top three drives causing data loss for customers in the past two years. The system may collect data from drives weekly (heartbeat), and pass that data to a data retention system and from there the analytics system may pull the data for analysis. All data across all drives are then analyzed for trends, and if a part fails, the data leading up to the failure is used by the analytics system to learn how to identify other drives that are likely to fail. Data from all drives are used for analytics, not just the drives that fail. The analytics system may disable a drive that it has predicated as likely to fail. In some embodiments of the present invention, the disabling includes removing the drive via electronic and/or physical removal. In regards to the "Reassigns including Pending Reassigns" field, a "reassign" may occur where there is a small section of a disk that is bad. Spare sectors are set aside to handle this error, and the data is "reassigned" to one of the spare sectors. A "pending reassign" occurs when the data has not yet been reassigned. For example, a "pending reassign" may occur where a drive has identified a bad area but the drive has not yet received new data for storage in a new location. In other words, the reassignment field tracks how often data needs to be moved from a sector that is marginal to a new sector of the disk device.

Contemporary analytics systems use a predefined set of parameters to predict drive failures, which are set at a system or firmware design level. Accordingly, it can be time consuming and inefficient to update those systems based on problems that are identified in real-time in the field.

Similarly, contemporary systems utilize SMART log capture of attributes. However, those contemporary systems provide inaccurate results as the range of data that is captured in those SMART logs is limited. Those systems do not use a global install based on related parts at a current time for SMART analysis for failure prediction of the systems. Rather, those systems utilize predictive algorithms that are restricted by information of a drive that is presently known at the time of a product release or code update.

Contemporary systems have several drawbacks. First, some contemporary systems require that a full system log be retrieved from a drive device and then the log be parsed in full, which is time consuming and less compact in comparison to the updated SMART log that will be described in further detail below.

One or more embodiments of the present invention address one or more of the above-described shortcomings of the prior art by providing an analysis system that relies on a drive condensing data into a drive log page such as, for example, a SMART log before the data is transmitted to an analytics system. The data is then leveraged in real-time by the analysis system to predict failure or a drive, and/or to provide to the system without human involvement. The data that is collected can be used to isolate global issues more quickly and to make real-time decisions as to whether to use a drive for a particular application. In some embodiments of the present invention, the improved process of failure prediction and feedback greatly reduces the number and length of unplanned system outages. In some embodiments of the present invention, instead of having multiple drives fail at the same time during an important operation, which may lead to data loss, system downtime, or system slowdowns, the analytics system is configured to disable (e.g., remove) drives at a convenient time in response to predicting that a drive is likely to fail.

Turning now to FIG. 1, an example distributed environment 100 is presented for performing disk drive failure predictions. Distributed environment 100 includes one or more user devices 102 and an analytics system 104, which are interconnected via network 106. FIG. 1 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims.

Analytics system 104 includes a prediction component 108, a messaging component 110, a machine learning component 112, and/or one or more databases 114. In some embodiments of the present invention, prediction component 108, messaging component 110, machine learning component 112, and/ database(s) 114 are interconnected via a communication infrastructure and/or communication path such as the one shown in FIG. 7. Analytics system 104 may have internal and external hardware components, such as those depicted and described below with respect to FIG. 7.

Analytics system 104 is a machine learning system that can be utilized to solve a variety of technical issues (e.g., learning previously unknown functional relationships) in connection with technologies such as, but not limited to, machine learning technologies, video processing technologies, virtual reality technologies, data analytics technologies, data classification technologies, data clustering technologies, recommendation system technologies, signal processing technologies, text analysis technologies, and/or other digital technologies. Analytics system 104 employs hardware and/or software to solve problems that are highly technical in nature, that are not abstract and that cannot be performed as a set of mental acts by a human.

In certain embodiments of the invention, some or all of the processes performed by analytics system 104 are performed by one or more specialized computers for carrying out defined tasks related to machine learning. In some embodiments of the invention, analytics system 104 and/or components of the system are employed to solve new problems that arise through advancements in technologies mentioned above.

Machine learning is often employed by numerous technologies to determine inferences and/or relationships among digital data. For example, machine learning technologies, signal processing technologies, image processing technologies, data analysis technologies, and/or other technologies employ machine learning models to analyze digital data, process digital data, determine inferences from digital data, and/or determine relationships among digital data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

In some embodiments of the present invention, analytics system 104 is a standalone computing device, a management server, a web server, a mobile computing device, or other suitable electronic device and/or computing system capable of receiving, sending, and processing data. In some embodiments of the present invention, analytics system 104 is a server computing system utilizing multiple computers, such as in cloud computing environment 50. In some embodiments of the present invention, analytics system 104 is a laptop computer, a tablet computer, a netbook computer, a personal computer (PC), a desktop computer, a personal digital assistant (PDA), a smart phone, or other suitable programmable electronic device capable of communicating with user device 102 and other computing devices (not shown) within distributed environment 100 via network 106. In some embodiments of the present invention, analytics system 104 is a computing system utilizing clustered computers and components (e.g., database server computers, application server computers, etc.) that act as a single pool of seamless resources that are accessible within distributed environment 100. Analytics system 104 may have internal and external hardware components, such as those depicted and described below with respect to FIG. 7.

Figure 5:
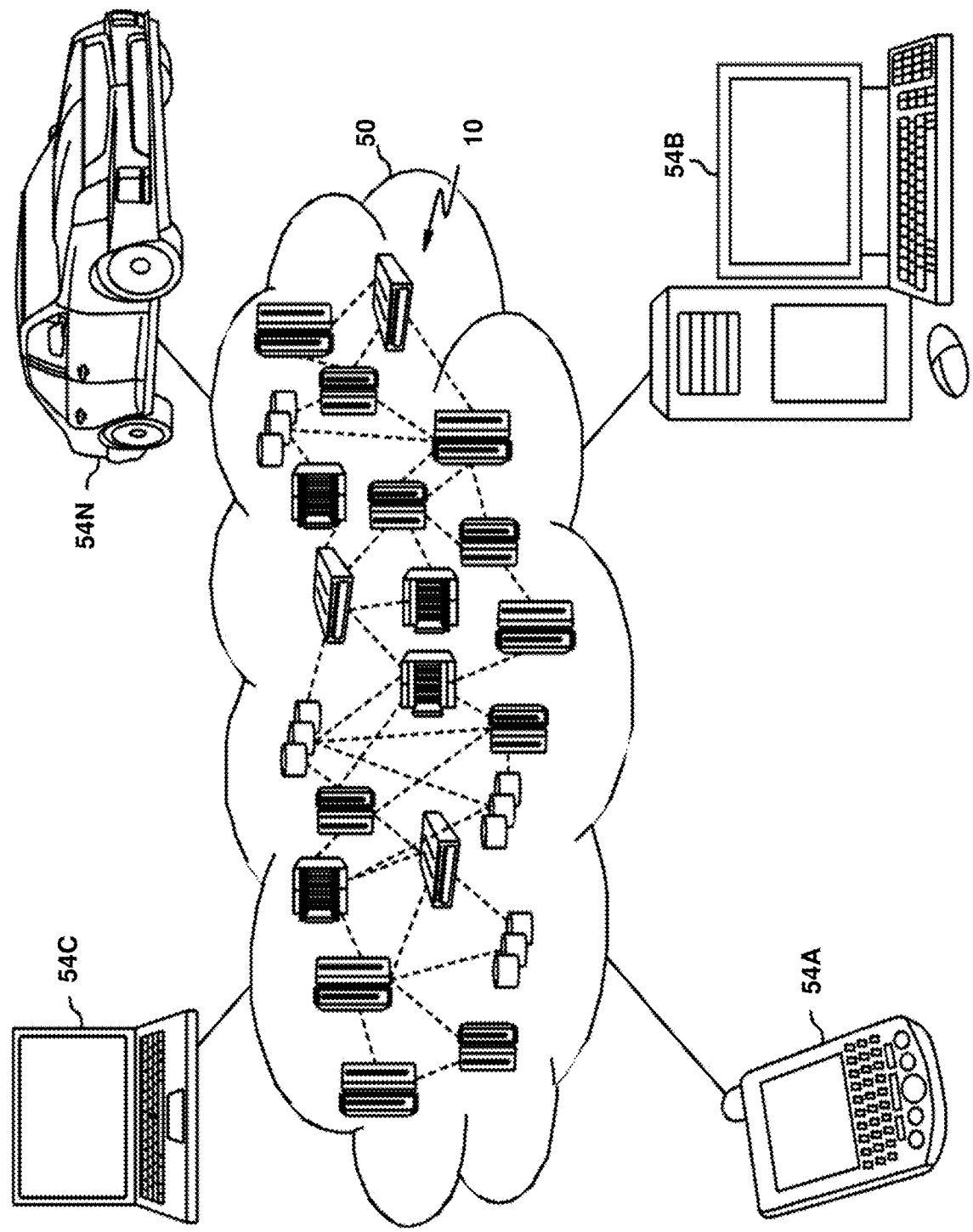
FIG. 5 depicts a cloud computing environment according to one or more embodiments of the present invention.

Network 106 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between user device 102 and analytics system 104, and/or other computing devices (not shown) within a distributed environment 100. In some embodiments of the present invention, distributed environment 100 is implemented as part of a cloud computing environment such as cloud computing environment 50 (FIG. 5).

User device 102 is configured to generate and transmit drive log pages such as, for example, SMART logs based on drive data that is generated by one or more disk devices (e.g., drives) of user device 102. In some embodiments of the present invention, user device 102 is a disk device, a laptop computer, a tablet computer, a netbook computer, a personal computer (PC), a desktop computer, a personal digital assistant (PDA), a smart phone, an internet-of-things (IoT) enabled device, a VR/Augmented Reality (AR) display device, and/or other suitable programmable electronic devices capable of communicating with various components and devices within distributed environment 400. In some embodiments of the present invention, user device 102 comprises two or more separate devices. In some embodiments of the present invention, user device 102 is a programmable electronic mobile device or a combination of programmable electronic mobile devices capable of executing machine readable program instructions and communicating with other computing devices (not shown) within distributed environment 100. In some embodiments of the present invention, user device 102 may include internal and external hardware components, such as those depicted and described below with respect to FIG. 7.

In general, in some embodiments of the present invention, analytics system 104 is a cognitive-based tool that is configured to collecting data from customers and leveraging analytics to transmit a notification to a user notifying the user of an issue. Analytics system 104 identifies usage patterns that lead to failures or issues at user sites based on new data (e.g., customer systems, user devices, etc.). Analytics system 104 identifies systems that include usage patterns that will lead to failures (i.e., predictive failures). Analytics system 104 leverages analytics to notify a user of a change in trend (e.g., support team) based on identifying a predictive failure that can be triggered by analytics, but isn't predefined at the time of design or when the firmware is written.

In some embodiments of the present invention, analytics system 104 is configured to collect a set of data from a plurality of drive devices (e.g., SSD drives, HDD drives, etc.), in which the data includes a set of updated SMART attributes that may be utilized to predict future failures of a drive device (e.g., drive of user device 102, drive of drive of analytics system 104, etc.). FIGS. 2A-2C provides an example SMART log SMART log page 200 having a plurality of attribute fields, in which each attribute field is associated with one or more of an attribute name field 202, a drive type identification code field 204 (e.g., hex code), a hard disk drive (HDD)/solid state drive (SSD) type indicator field 206, a PFA trip point field 208, a normalized formula field 210, and/or a raw data definition field 212. In some embodiments of the present invention, the raw data definition field 212 of each attribute is associated with a respective number of bytes. In comparison to contrary implementation, SMART log SMART log page 200 includes an addition set of attribute fields, in which the additional set of attribute fields includes one or more the fields such as the ones referenced as element 214 in FIGS. 2A-2C. The additional fields allow for an improved manner of predicting failure of a drive. For example, in some embodiments of the present invention, the one or more fields of the additional set of attribute fields includes a "reassigns including pending reassigns" attribute name field 202, which is associated with a HDD indication in field 206. In some embodiments of the present invention, the raw data definition field 212, which is associated with the "reassigns including pending reassigns" attribute name field 202, includes a definition that byte 6 stores an identifier of the head of the disk drive that has the most reassigned counted (e.g., disk read/write mechanical head), bytes 7-10 stores the number of reassigns for the head at byte 6, and bytes 11-14 stores the number of pending resigns for the head at byte 6. The "reassigns including pending reassigns" field assists in predicting outgassing issues related to drives before the issues occur. For example, in some embodiments of the present invention, the "reassigns including pending reassigns" field may be used by analytics system 104 of FIG. 1 (e.g., prediction component 108) to predict failures for the top three drive that are found to cause data lost for users over a particular time span (e.g., two years).

In some embodiments of the present invention, the one or more fields of the additional set of attribute fields further or alternatively include a set of one or more HDD fields and a set of one or more SSD fields. For example, in some embodiments of the present invention, the one or more HDD fields includes the "reassigns including pending reassigns" mentioned above, a relative vibration (RV) monitor field, and/or a helium monitor field. In some embodiments of the present invention, the RV monitor field assists with detecting vibration issues, motor problems, and/or machine room fire suppression discharge. In some embodiments of the present invention, the helium monitor field assists in predicting future failures of helium drives. In some embodiments of the present invention, the one or more SSD fields includes a "program fail count" field, an "erase fail count" field, and/or an "available reserve flash memory space" field. In some embodiments of the present invention, the "program fail count" field, and the "erase count field" assist in predicting flash related failures before the failure occurs. In some embodiments of the present invention, the "available reserve flash memory space" field assists in predicting issues where overprovisioned memory may be reduced.

Referring back to FIG. 1, in some embodiments of the present invention, each drive device such as user device 102 is configured to provide drive log attribute data (e.g., SMART attribute data of SMART log SMART log page 200) in response to receiving a read request from analytics system 104. In some embodiments of the present invention, the read request is received over a communication network via an API call (e.g., by messaging component 110). In some embodiments of the present invention, the SMART attribute data is collected from each drive devices on a periodic basis such as, for example, on a weekly basis. In some embodiments of the present invention, the data collected from the drives is received as a heartbeat signal, which is then passed to the system and stored in one or more databases (e.g., database 114). Analytics system 104 may utilize the collected data to learn, via machine learning, how to identify which drives will fail (e.g., by machine learning component 112). Data from all drives can be used for analytics, not just data from drives that have already been detected to have failed.

In some embodiments of the present invention, the data that is collected by analytics system 104 is utilized to execute an analytics initiated PFA (AIPFA) processing, one or more analytics initiated actions, and/or one or more analytics initiated message (AIM) system messages. As noted above, in contemporary systems, the prediction of failures were based on a predetermined set of generic attributes as prediction of failures at the drive, and system level and system messages were based on broad design level criteria. In contrast, in some embodiments of the present invention, analytics system 104 is configured to execute AIPFA and/or transmit AIM messages in real-time without the need of a predefined failure pattern (e.g., user provided pattern). For example, in some embodiments of the present invention, system 104 is configured to define parameters in real-time that can be used to predict failures by, for example, part number and/or by month. In some embodiments of the present invention, while analytics system 104 is receiving feedback in real-time, analytics system 104 may execute one or more machine learning algorithms to surface sensitivities of drives and define separate categories for failure classification.

In some embodiments of the present invention, analytics system 104 is configured to generate a set of suggested AIPFA rules based on trends across a drive population, in which analytics system 104 may be further trained by accepting or changing the messages. Based on this process, predictive failure rules and messages may be targeted by analytics system 104 for specific drives, workloads, or identified patterns. For example, in some embodiments of the present invention, analytics system 104 is configured to dynamically update AIPFA rules via machine learning such that analytics system 104 is able to improve the manner of recognizing patterns based on new information and failures. By applying machine learning and training in this way, analytics system 104 may further assist with preventing user data loss by taking the drives offline prior to the drive failing.

In some embodiments of the present invention, analytics system 104 is configured to provide an AIM communication to a user device 102 (e.g., by messaging component 110) to apply a fix to a drive of user device 102 in response to detecting a failure pattern. Consider an example scenario where a change in an environment of a machine room has been detected such as, for example, a change in temperature (e.g. drive temperature, room temperature, etc.), analytics system 104 may be configured to warn users when a current behavior is negatively affecting the drives. For example, if a user is near exceeding the number of writes that are supported by an SSD, analytics system 104 may detect that an early failure of the drive may occur and notify the user a workload should be investigated.

In some embodiments of the present invention, analytics system 104 collects key drive data needed for predictive analysis in a stream-lined way such that data can be pulled easily on a regular basis from disk drives. Analytics system 104 takes advantage of this data by predicting failures in advance, providing feedback to systems, notifying users of a predicted failure, and/or performing one or more action to remedy the failure (e.g., removing/disabling the drive). Key parameters are defined in a new drive location (e.g., updated SMART log page 200 of FIGS. 2A-2C) such that the drive is able to log key data, which is then collected from the drive on a periodic basis. In some embodiments of the present invention, the data is provided to suppliers so that providers can feed the data into their own analytics engines to be able to more quickly fix issues, and to allow for better virtual failure analysis since more valuable information is collected. In contrast, contemporary analytics systems are often limited to collecting data from failed drives only and often receive that information several weeks after failure. Some contemporary systems collect drive logs, but those logs are orders bigger in size as compared to SMART log page 200 and require parsing of the log by a fixed vendor tool, which relies on a time-consuming, invasive process.

Figure 3:
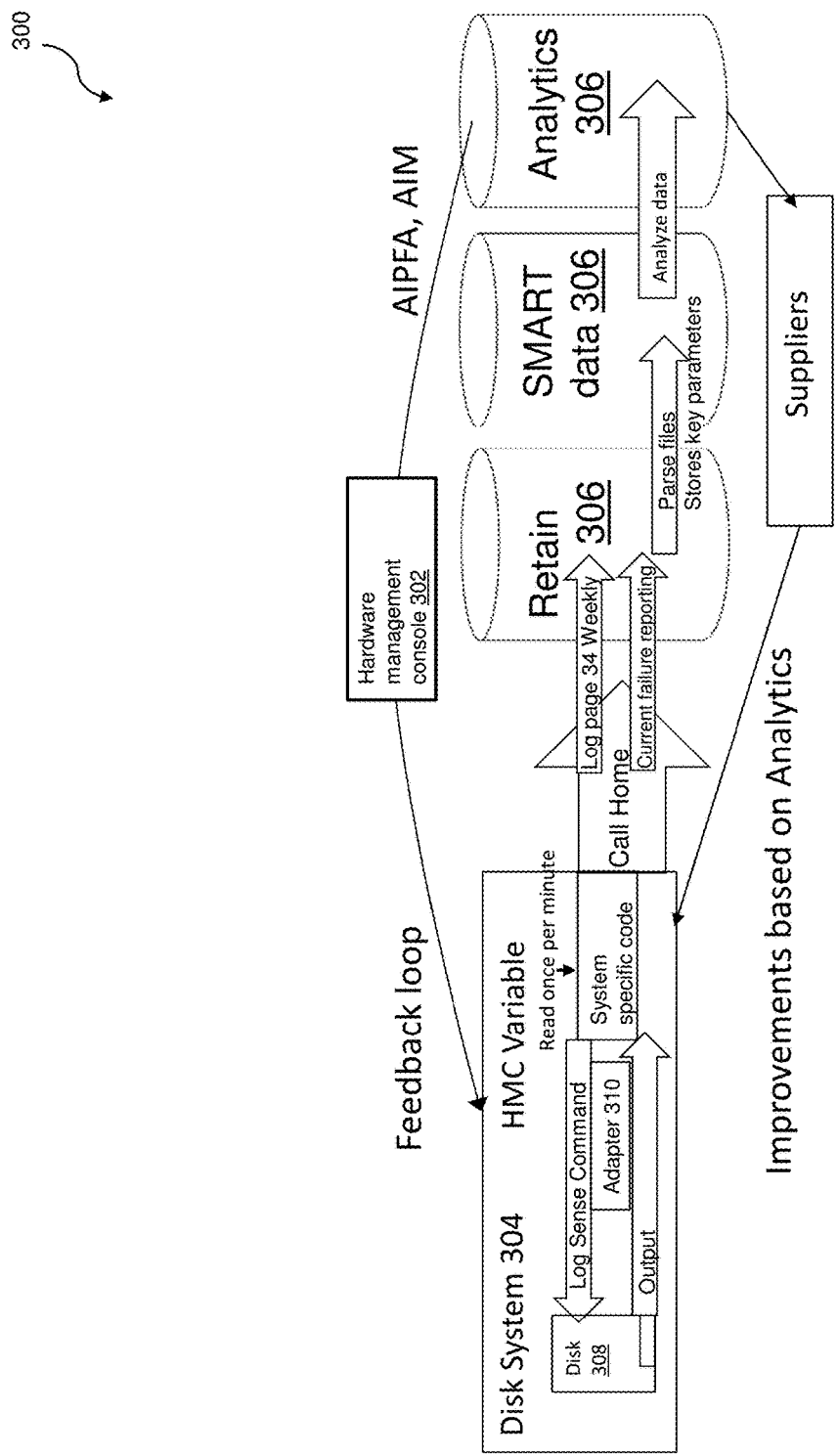
FIG. 3 depicts a system architecture of an example analytics environment in accordance with one or more embodiments of the present invention.

FIG. 3 depicts a system architecture of an example analytics environment 300 in accordance with one or more embodiments of the present invention. Analytics environment 300 includes a hardware management console (HMC) 302, a disk system 304, and one or more databases 306 (i.e. retain database, SMART data database, analytics database. The disk system 304 houses a disk 308 that is in communication with the one or more databases 306 via an adapter 310. Disk 308 is configured to output a drive log page (e.g., SMART log) in response to receive a log sense command. Disk system 304 transmits a call home message for storage and analytics via the HMC 302. In some embodiments of the present invention, a log page is weekly sent from disk system 304 to a first database (i.e., retain database), files of the retain database are parsed and key parameters from the parsing are stored in a second database (i.e., SMART data database), then data from the second database is analyzed and stored in a third database (i.e., analytics database). The analytics may be fed back into disk system 304 via a feedback loop. Analytics may also be outputted to suppliers such that suppliers may update disk system 304 based on the improvements. In some embodiments a single database is used to house the combination of information rather than storing in three databases.

Figure 4:
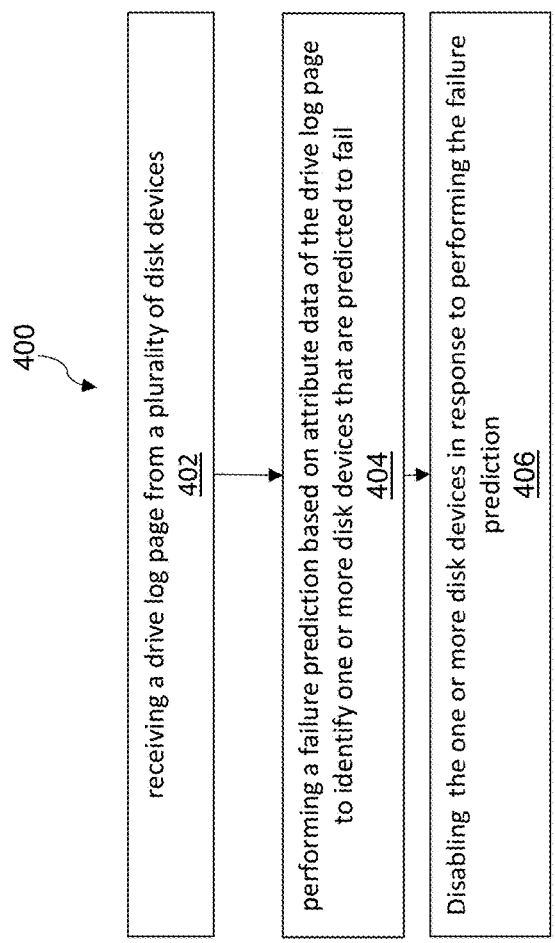
FIG. 4 depicts a flow diagram illustrating a methodology in accordance with one or more embodiments of the present invention.

Additional details of the operation of analytics system 104 will now be described with reference to FIG. 4, wherein FIG. 4 depicts a flow diagram illustrating a methodology 400 executed by analytics system 104 according to one or more embodiments of the present invention. At block 402, a drive log such as a SMART log page is received from a plurality of disk devices, in which the drive log page includes a plurality of attribute fields, in which the plurality of attribute fields includes a Reassigns Including Pending Reassigns field. At block 404, a failure prediction performed based on attribute data of the drive log page to identify one or more disk devices that are predicted to fail. At block 406, the one or more disk devices are disabled in response to the failure prediction.

In some embodiments of the present invention, the plurality of attribute fields further includes one or more of a RV monitor field, a helium monitor field, a program fail count field, an erase fail count field, and an available reserve flash memory space field.

In some embodiments of the present invention, each attribute field of the plurality of attribute fields is associated with one or more of an attribute name, a hard disk drive/solid state drive type indicator, and/or a raw data definition. In some embodiments of the present invention, the raw data definition field that associated with the Reassigns Including Pending Reassigns field includes a definition indicating that byte 6 is to store an identifier of a head of a disk drive and/or that bytes 7-10 are to store the number of reassigns for the head at byte 6. In some embodiments of the present invention, the definition of the Reassigns Including Pending Reassigns field further includes that bytes 11-14 are to store number of pending resigns for the head at byte 6.

In some embodiments of the present invention, methodology 400 includes generating, by the system, a failure notification in response to the failure prediction, in which the notification indicates which disk devices (e.g., one or more drives) have been predicted to fail. The failure notification is then transmitted to a user device associated with the disks devices that have been predicted to fail.

In some embodiments of the present invention, methodology 400 includes generating a set of suggested analytics initiated predictive failure (AIPFA) rules based on trends across the plurality of disk devices. The AIPFA rules are then update via machine learning. A second failure predication is then performed based on the updated AIPFA rules. In some embodiments of the present invention, the second failure prediction is performed on the plurality of disk devices, a subset of the plurality of disk devices, and/or on a second plurality of disk devices.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
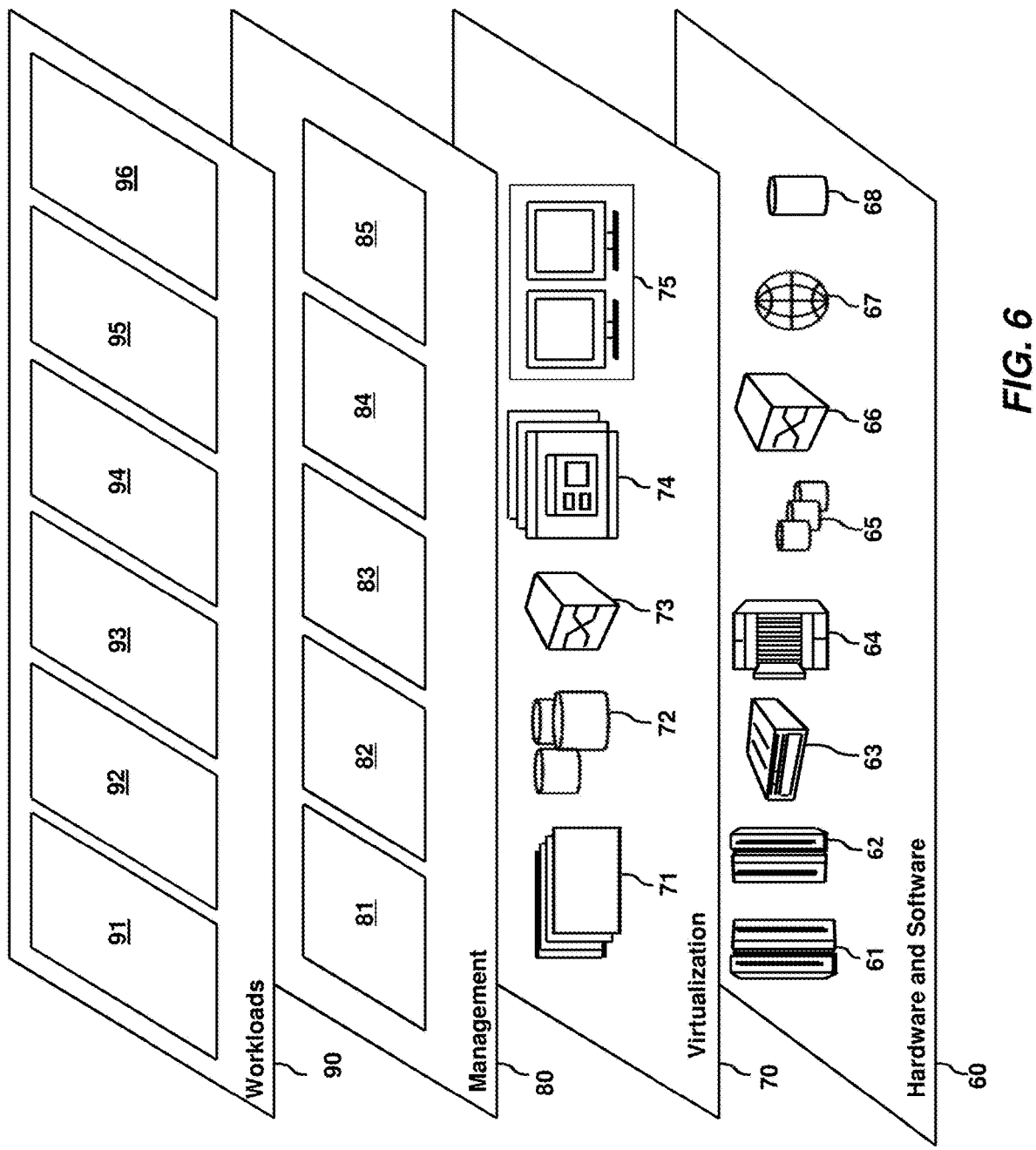
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and drive log processing 96.

Figure 7:
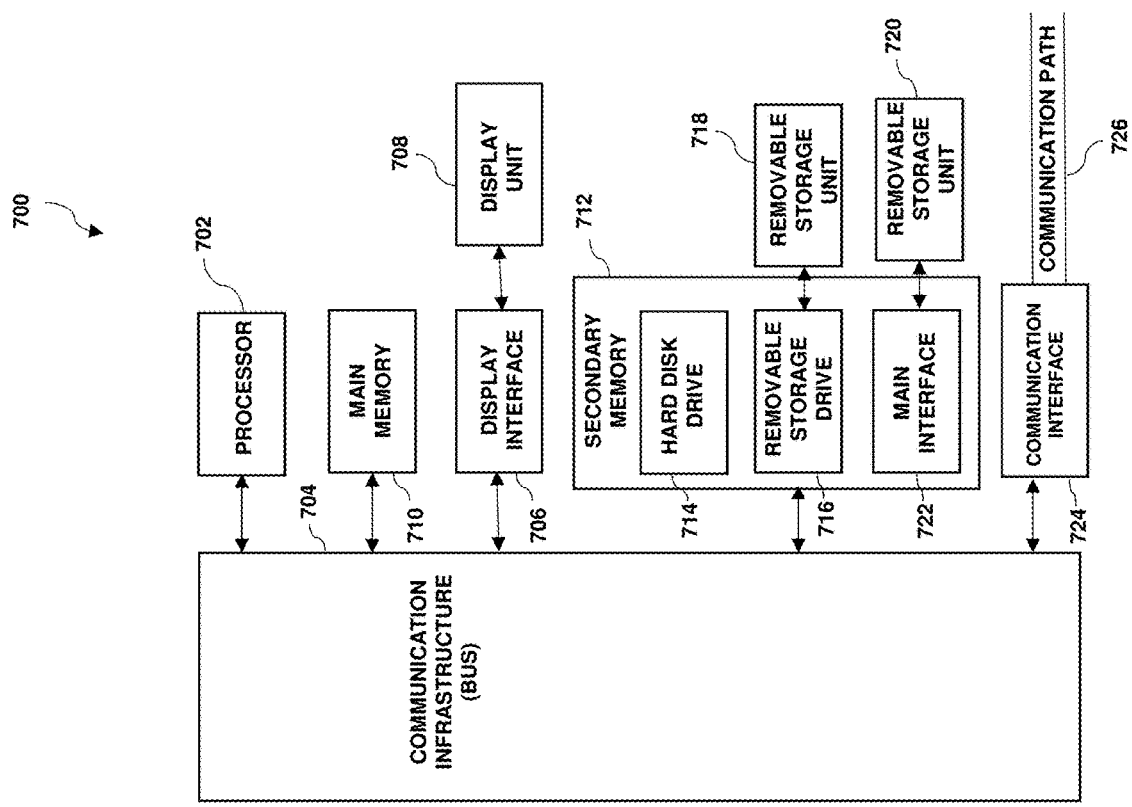
FIG. 7 depicts an exemplary computer system capable of implementing one or more embodiments of the present invention.

FIG. 7 illustrates a high-level block diagram showing an example of a computer-based system 300 that is useful for implementing one or more embodiments of the invention. Although one exemplary computer system 700 is shown, computer system 700 includes a communication path 726, which connects computer system 700 to additional systems and may include one or more wide area networks (WANs) and/or local area networks (LANs) such as the internet, intranet(s), and/or wireless communication network(s). Computer system 700 and additional systems are in communication via communication path 726, (e.g., to communicate data between them).

Computer system 700 includes one or more processors, such as processor 702. Processor 702 is connected to a communication infrastructure 704 (e.g., a communications bus, cross-over bar, or network). Computer system 700 can include a display interface 706 that forwards graphics, text, and other data from communication infrastructure 704 (or from a frame buffer not shown) for display on a display unit 708. Computer system 700 also includes a main memory 710, preferably random-access memory (RAM), and may also include a secondary memory 712. Secondary memory 712 may include, for example, a hard disk drive 714, solid state drive, and/or a removable storage drive 716, representing, for example, a floppy disk drive, a magnetic tape drive, or an optical disk drive. Removable storage drive 716 reads from and/or writes to a removable storage unit 718 in a manner well known to those having ordinary skill in the art. Removable storage unit 718 represents, for example, a floppy disk, a compact disc, a magnetic tape, or an optical disk, etc., which is read by and written to by a removable storage drive 716. As will be appreciated, removable storage unit 718 includes a computer readable medium having stored therein computer software and/or data.

In some alternative embodiments of the invention, secondary memory 712 may include other similar means for allowing computer programs or other instructions to be loaded into the computer system. Such means may include, for example, a removable storage unit 720 and an interface 722. Examples of such means may include a program package and package interface (such as that found in video game devices), a removable memory chip (such as an EPROM or PROM) and associated socket, and other removable storage units 720 and interfaces 722 which allow software and data to be transferred from the removable storage unit 720 to computer system 700.

Computer system 700 may also include a communications interface 724. Communications interface 724 allows software and data to be transferred between the computer system and external devices. Examples of communications interface 724 may include a modem, a network interface (such as an Ethernet card), a communications port, or a PCM-CIA slot and card, etc. Software and data transferred via communications interface 724 are in the form of signals which may be, for example, electronic, electromagnetic, optical, or other signals capable of being received by communications interface 724. These signals are provided to communications interface 324 via communication path (i.e., channel) 726. Communication path 726 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 710 and secondary memory 712, removable storage drive 716, and a hard disk installed in hard disk drive 714 and/or solid state drive. Computer programs (also called computer control logic) are stored in main memory 710, and/or secondary memory 712. Computer programs may also be received via communications interface 724. Such computer programs, when run, enable the computer system to perform the features of the present disclosure as discussed herein. In particular, the computer programs, when run, enable processor 702 to perform the features of the computer system. Accordingly, such computer programs represent controllers of the computer system.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
  receiving, by a system comprising one or more processors, a drive log page including data from a plurality of disk devices, wherein the drive log page includes a plurality of attribute fields including a reassignment field that tracks data movement and pending data movement from a failing sector of a disk device to a new sector of the disk device, the pending data movement including pending reassigns that occur when the failing sector of the disk device has been identified and prior to receiving new data for storage at the new location;
  performing, by the system, a failure prediction based on attribute data of the drive log page to identify one or more disk devices of the plurality of disk devices that are predicted to fail; and disabling, by the system, the one or more disk devices in response to the failure prediction, the disabling comprising electronically removing access to the one or more disk devices.

2. The computer-implemented method of claim 1, wherein each attribute field of the plurality of attribute fields is associated with one or more of an attribute name field, a memory drive type indicator field, and a raw data definition field.

3. The computer-implemented method of claim 2, wherein the raw data definition field associated with the reassignment field includes a definition indicating that a select byte value stores an identifier of a head of a disk drive and that a particular byte value range stores the number of reassigns for the head at the byte value.

4. The computer-implemented method of claim 3, wherein the definition of the reassignment field further includes that bytes 11-14 store the number of pending reassigns for the head at byte 6.

5. The computer-implemented method of claim 1 further comprising:
   in response to the failure prediction, generating, by the system, a failure notification indicating that the one or more disk devices have been predicted to fail; and
   transmitting, by the system, the failure notification to a user device associated with the one or more drives.

6. The computer-implemented method of claim 1 further comprising:
   generating a set of suggested analytics rules based on trends across the plurality of disk devices;
   dynamically updating the analytics rules via machine learning; and
   performing a second failure predication based on the updated analytics rules.

7. The computer-implemented method of claim 1, wherein the plurality of attribute fields further includes at least a relative vibration monitor field, a helium monitor field, a program fail count field, an erase fail count field, or an available reserve flash memory space field.

8. A system comprising:
   a memory having computer readable instructions; and
   one or more processors for executing the computer readable instructions, the computer readable instructions controlling the one or more processors to perform operations comprising:
   receiving a drive log page including data from a plurality of disk devices, wherein the drive log page includes a plurality of attribute fields including a reassignment field that tracks data movement and pending data movement from a failing sector of a disk device to a new sector of the disk device, the pending data movement including pending reassigns that occur when the failing sector of the disk device has been identified and prior to receiving new data for storage at the new location;
   performing a failure prediction based on attribute data of the drive log page of the plurality of disk devices to identify one or more disk devices that are predicted to fail; and
   disabling the one or more disk devices in response to the failure prediction, the disabling comprising electronically removing access to the one or more disk devices.

9. The system of claim 8, wherein each attribute field of the plurality of attribute fields is associated with one or more of an attribute name field, a memory drive type indicator field, and a raw data definition field.

10. The system of claim 9, wherein the raw data definition field associated with the reassignment field includes a definition indicating that a select byte value stores an identifier of a head of a disk drive and that a particular byte value range stores the number of reassigns for the head at the byte value.

11. The system of claim 10, wherein the definition of the reassignment field further includes that bytes 11-14 store number of pending reassigns for the head at byte 6.

12. The system of claim 8, the operations further comprising:
   in response to the failure prediction, generating a failure notification indicating that the one or more disk devices have been predicted to fail; and
   transmitting the failure notification to a user device associated with the one or more drives.

13. The system of claim 8, the operations further comprising:
   generating a set of suggested analytics rules based on trends across the plurality of disk devices;
   dynamically updating the analytics rules via machine learning; and
   performing a second failure predication based on the updated analytics rules.

14. The system of claim 8, wherein the plurality of attribute fields further includes at least a relative vibration monitor field, a helium monitor field, a program fail count field, an erase fail count field, or an available reserve flash memory space field.

15. A computer program product comprising a computer readable storage medium having program instructions embodied therewith, the program instructions executable by system comprising one or more processors to cause the system to perform operations comprising:
   receiving, by the system, a drive log page including data from a plurality of disk devices, wherein the drive log page includes a plurality of attribute fields including a reassignment field that tracks data movement and pending data movement from a failing sector of a disk device to a new sector of the disk device, the pending data movement including pending reassigns that occur when the failing sector of the disk device has been identified and prior to receiving new data for storage at the new location;
   performing, by the system, a failure prediction based on attribute data of the drive log page to identify one or more disk devices of the plurality of disk devices that are predicted to fail; and
   disabling, by the system, the one or more disk devices in response to the failure prediction, the disabling comprising electronically removing access to the one or more disk devices.

16. The system of claim 15 wherein each attribute field of the plurality of attribute fields is associated with one or more of an attribute name field, a memory drive type indicator field, and a raw data definition field.

17. The system of claim 16, wherein the raw data definition field associated with the reassignment field includes a definition indicating that a select byte value stores an identifier of a head of a disk drive and that a particular byte value range stores the number of reassigns for the head at the byte value.

18. The system of claim 15, the operations further comprising:
   in response to the failure prediction, generating a failure notification indicating that the one or more disk devices have been predicted to fail; and transmitting the failure notification to a user device associated with the one or more drives.

19. The system of claim 15, the operations further comprising:
generating a set of suggested analytics rules on trends across the plurality of disk devices;
dynamically updating the analytics rules via machine learning; and
performing a second failure predication based on the updated analytics rules.

20. The system of claim 15, wherein the plurality of attribute fields further includes at least a relative vibration monitor field, a helium monitor field, a program fail count field, an erase fail count field, or an available reserve flash memory space field.

* * * * *